D. D. BOLICK.
FLY TRAP.
APPLICATION FILED OCT. 17, 1911.
1,017,644.
Patented Feb. 20, 1912.
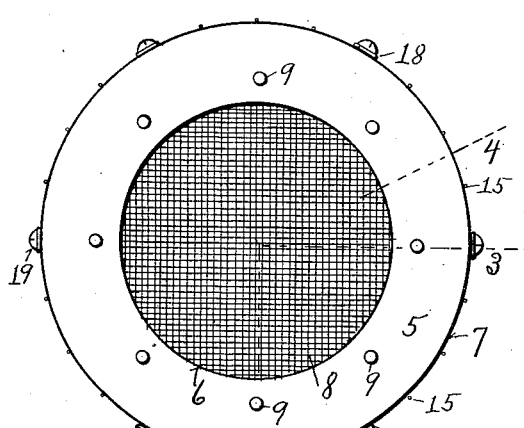
Fig. 1
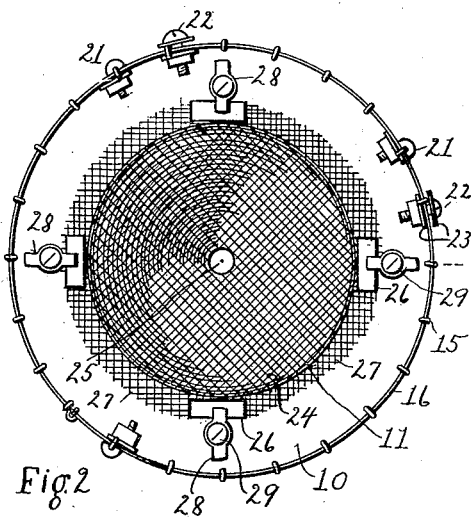
Fig. 2
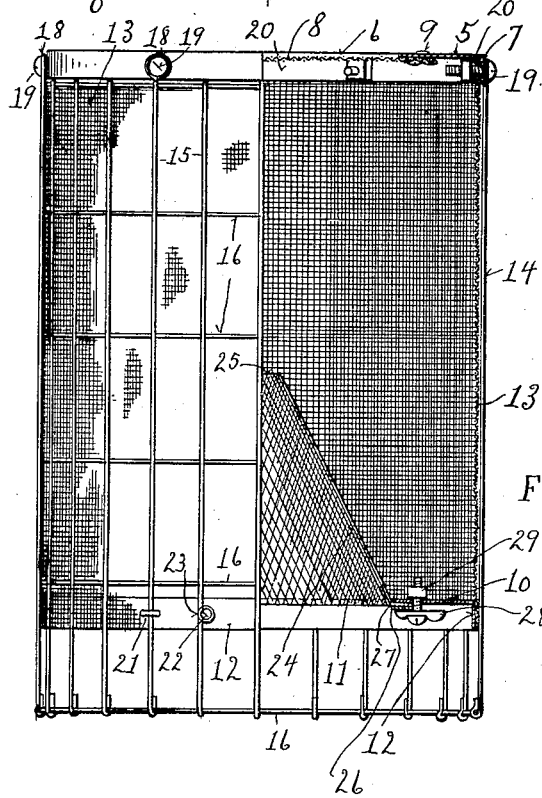
Fig. 3
Fig. 4
Witnesses
Inventor
David D. Bolick

UNITED STATES PATENT OFFICE.

DAVID D. BOLICK, OF TOPEKA, KANSAS, ASSIGNOR OF ONE-HALF TO T. H. HASSEY, OF BROOKLYN, NEW YORK.

FLY-TRAP.

1,017,644.  Specification of Letters Patent.  Patented Feb. 20, 1912.

Application filed October 17, 1911. Serial No. 655,165.

*To all whom it may concern:*

Be it known that I, DAVID D. BOLICK, a citizen of the United States, residing at Topeka, in the county of Shawnee and State of Kansas, have invented certain new and useful Improvements in Fly-Traps, of which the following is a specification.

It is the object of my invention to provide a fly trap that is of a large size, of all metal, simple and economical in manufacture, and that is durable, strong, and capable in every way of withstanding the use and abuse when placed out of doors, in the yard, in the field, upon the side-walk, or elsewhere.

It is a further object of my invention to construct the fly trap in such a way that it can be made in parts in the factory, and shipped in knocked-down condition, and then set up by any person with the simple tools that are always available, such as a screw-driver.

To attain these objects, my invention comprises top and bottom sheet metal plates, a wire cloth in cylindrical form placed upon the plates, and a series of protecting wires on the outside of the wire cloth.

It further consists of the several details of construction, and the parts, improvements, and combinations hereinafter set forth and claimed.

In the drawings accompanying and forming part of this specification, and in the description of the drawings, I have shown my invention in its preferred form, and have shown what I deem to be the best mode of applying the principles thereof; but, within the scope of the appended claims, there may be changes in form, proportions, and materials, the transposition of parts, and the substitution of equivalent members, without departing from the spirit of my invention.

Figure 1 is a top view of a fly trap made in accordance with the principles of my invention. Fig. 2 is a bottom view. Fig. 3 is an elevation, the right one-half being shown in vertical center sectional elevation, as indicated by the line 3 of Fig. 1. Fig. 4 is an enlarged detail of one of the upper corners, being a section on the line 4 of Fig. 1.

Similar reference characters indicate like or corresponding parts throughout the several views.

5 is the top plate made of sheet metal, with a large opening 6 in its middle part, and a downwardly projecting flange 7 around its outer edge.

8 is a wire cloth covering the opening, and secured preferably to the under side of the plate by means of any suitable fasteners 9, 9.

10 is the bottom plate, also having a central opening 11, and a downwardly extending flange 12.

13 is a wire cloth placed around the two plates in cylindrical shape, the two plates forming the ends of the cylinder. It will be noted that the wire cloth is inside the flange of the top plate and outside the flange of the bottom plate.

14 is a wire netting, comprising vertical wires 15 and horizontal wires 16, these wires being electrically welded together at their joints. A number of the vertical wires are extended and formed with loops 18 at their upper ends, for the reception of the bolts 19, which pass therethrough, and also through the flange of the top plate, the wire cloth, and the ring 20; from which it will be understood that the wire cloth is clamped firmly between the ring and the flange, and all parts are secured together by means of the bolts.

An object in having the wire cloth on the inside of the upper flange is to present a neat appearance, and also to prevent the water from accumulating between the flange and the clamping ring and rusting the wire cloth. As shown, the wire netting extends down below the bottom plate so as to raise it up off the ground, and one of the horizontal wires is located at the extreme lower ends of the vertical wires. The lower edge of the wire cloth is secured on the outside of the lower flange and is clamped between the flange and the wire netting by means of the bolts 21, 22, and washers 23, some of these bolts may be formed with hooks on their outer ends to hold the vertical wires more firmly in place.

24 is a wire cloth cone fitting in the opening in the bottom plate and having a small opening 25 at its upper end, which extends up into the trap.

26, 26 are a number of plates secured at intervals to the lower edge of the cone, which is ragged by reason of cutting it into proper shape. The lower edge is mashed out flat against the under side of the bottom plate, as shown at 27, and the plates 26 are then secured against the bottom plate by means of the buttons 28 on bolts 29.

It will be noted that when the several parts are made up, it becomes an easy matter to assemble the traps with only such simple tools as are always available. Thus, the top and bottom plates may be made as shown, the wire cloth may be secured on the upper plate; the cone may be made up with its plates 26, 26, and may be shipped in flat condition; the wire netting may be cut in proper length with suitable loops; while the wire cloth of proper width may be packed and shipped in a single length for one only of the traps, or in larger rolls for more traps. It may be well to state that unless the trap can be so devised that it can be shipped in a knocked-down condition, it cannot be economically shipped any considerable distance.

The wire netting is preferably made of rather heavy wire, and of a mesh small enough to protect the wire cloth from injury, as by dropping the trap, or by kicking it to see the flies swarm. Furthermore, this netting holds the trap rigid, and prevents sagging and twisting. Being large, strong, and durable, this trap is especially adapted for out-door use; as in the yard, in the street or alley or in the field.

To use it, a suitable bait should be placed under it to attract the flies, which then fly up into the cone and through the hole at its apex into the interior of the trap, where they finally fall down onto the bottom plate. The trapped flies can be removed from time to time by merely removing the cone by turning the buttons and pulling the cone out.

What I claim is:

1. In combination, a top plate having a central opening and a downwardly extending flange around its outer edge, a similar bottom plate, a wire cloth extending from plate to plate and over the lower flange and inside the upper flange, a ring for clamping the wire cloth against the upper flange, a wire cloth covering the upper central opening, a wire cloth cone fitting in the lower opening and extending up into the trap and having an opening at its apex and having its lower edge flared out against the under side of the lower plate, a series of metal strips secured to said flared edge, a series of buttons pivoted to the bottom plate for securing said strips, a wire netting comprising vertical and horizontal wires surrounding the plates and cloth and extending below the bottom plate with a horizontal wire at the extreme lower end and the upper ends of some of the vertical wires terminating in loops, a series of bolts for securing said loops, clamping ring, wire cloth, and upper flange together, and a series of bolts for securing said netting, wire cloth, and lower flange together.

2. In combination, top and bottom circular plates, each having a central opening and a downwardly flanged edge, a wire cloth extending from plate to plate and secured inside the upper flange and outside the lower flange, a wire cloth covering the upper opening, a wire cloth cone in the lower opening extending into the trap and having a hole at its apex and flared lower edge, a series of pivoted buttons for holding said lower edge, and a wire netting surrounding the cloth and extending below the bottom plate.

3. In a fly trap of the kind described, the combination of a bottom plate having a central opening, a cone fitting in said opening and having its lower edge flared outwardly against the under side of said plate, a series of separate metal pieces secured to the flared-out edge, and a series of buttons pivoted to the bottom plate for holding the metal pieces against said bottom.

In testimony whereof I have affixed my signature in presence of two witnesses.

DAVID D. BOLICK.

Witnesses:
C. E. CARTER,
D. B. EADES.

---

Copies of this patent may be obtained for five cents each, by addressing the "Commissioner of Patents, Washington, D. C."